(12) United States Patent
Christon et al.

(10) Patent No.: US 8,326,663 B2
(45) Date of Patent: Dec. 4, 2012

(54) SYSTEM FOR OPTIMIZING LEAD CLOSE RATES

(75) Inventors: Tzaras R. Christon, Evanston, IL (US); Lewis Eric Wagner, Chicago, IL (US); Richard T. Schneider, Jr., Highwood, IL (US)

(73) Assignee: Leapfrog Online Customer Acquisition, LLC, Evanston, IL (US)

( * ) Notice: Subject to any disclaimer, the term of this patent is extended or adjusted under 35 U.S.C. 154(b) by 259 days.

(21) Appl. No.: 12/725,628

(22) Filed: Mar. 17, 2010

(65) Prior Publication Data

US 2011/0231230 A1    Sep. 22, 2011

(51) Int. Cl.
*G06Q 40/00* (2012.01)

(52) U.S. Cl. .................................. 705/7.11; 705/7.37

(58) Field of Classification Search ............... 705/10, 705/7.37, 7.11
See application file for complete search history.

(56) References Cited

U.S. PATENT DOCUMENTS

| | | | | |
|---|---|---|---|---|
| 7,693,801 B2 * | 4/2010 | Olavson | ........................ | 705/400 |
| 8,027,871 B2 * | 9/2011 | Williams et al. | ............. | 705/7.31 |
| 2004/0128261 A1 * | 7/2004 | Olavson et al. | ............... | 705/400 |
| 2005/0246219 A1 * | 11/2005 | Curtiss et al. | ................... | 705/10 |
| 2007/0129993 A1 * | 6/2007 | Alvin | ................. | 705/10 |
| 2007/0255614 A1 * | 11/2007 | Ourednik et al. | ............... | 705/10 |
| 2008/0109294 A1 * | 5/2008 | Williams et al. | ................ | 705/10 |
| 2009/0018894 A1 * | 1/2009 | Zamani et al. | .................. | 705/10 |
| 2009/0248492 A1 * | 10/2009 | Lloyd | ............................ | 705/10 |
| 2010/0332291 A1 * | 12/2010 | Smith | ............................ | 705/10 |
| 2011/0196716 A1 * | 8/2011 | Srinivasan et al. | ........... | 705/7.29 |
| 2011/0231230 A1 * | 9/2011 | Christon et al. | ............. | 705/7.42 |
| 2011/0258016 A1 * | 10/2011 | Barak et al. | .................. | 705/7.29 |
| 2011/0264479 A1 * | 10/2011 | Birr | ............................. | 705/7.13 |
| 2012/0016717 A1 * | 1/2012 | Williams et al. | ............. | 705/7.29 |

* cited by examiner

*Primary Examiner* — Thomas Dixon
*Assistant Examiner* — Benjamin S Fields
(74) *Attorney, Agent, or Firm* — Lempia Summerfield Katz LLC (57) ABSTRACT

A system is described for optimizing lead close rates. The system may create a seller scoring model that may be "trained" by a sales lead data over a period of time. The scoring model may be used to measure the performance of sellers in terms of handling and closing sales leads. The scoring model may be used to predict the sellers' close rates for future leads. The system may normalize the sellers based on lead volume to increase the confidence level in the scoring model. The system may utilize the scoring model to determine lead specific handling instructions for future leads to optimize sellers' close rates.

19 Claims, 8 Drawing Sheets

| 2009 | Total Leads | Total Sales | Close Rate |
|---|---|---|---|
| January | 140,892 | 11,924 | 8.46% |
| February | 123,017 | 11,650 | 9.47% |
| March | 144,976 | 14,852 | 10.24% |
| April | 148,697 | 15,118 | 10.17% |
| May | 147,256 | 16,855 | 11.45% |
| June | 124,079 | 15,454 | 12.45% |
| July | 168,134 | 23,108 | 13.74% |
| August | 177,977 | 17,642 | 9.91% |
| September | 91,778 | 8,063 | 8.79% |
| October | 96,482 | 5,976 | 6.19% |
| TOTALS | 1,363,288 | 140,642 | 10.32% |

FIG. 3

| Source | Total Leads | Percent Leads | Total Sales | Percent Sales | Close Rate |
|---|---|---|---|---|---|
| Direct to Site | 662,262 | 52.64% | 88,387 | 66.21% | 13.35% |
| Third Party Site | 593,067 | 47.14% | 44,665 | 33.46% | 7.53% |

| Seller Name | Zip Code | State | Percent Leads | Percent Sales | Close Rate | Seller Score | Average Leads per Month | Volume |
|---|---|---|---|---|---|---|---|---|
| Seller 1 | 76180 | TX | 0.23% | 0.25% | 14.58% | A | 168 | High |
| Seller 2 | 77375 | TX | 0.20% | 0.28% | 18.53% | A | 150 | High |
| Seller 3 | 77450 | TX | 0.18% | 0.22% | 16.21% | A | 134 | High |
| Seller 4 | 48170 | MI | 0.17% | 0.34% | 26.60% | A | 127 | High |
| Seller 5 | 78759 | TX | 0.17% | 0.22% | 17.28% | A | 124 | High |
| Seller 6 | 48335 | MI | 0.17% | 0.34% | 26.80% | A | 124 | High |
| Seller 7 | 48327 | MI | 0.16% | 0.28% | 23.49% | A | 118 | High |
| Seller 8 | 77388 | TX | 0.16% | 0.21% | 18.10% | A | 116 | High |
| Seller 9 | 48034 | MI | 0.16% | 0.27% | 23.30% | A | 116 | High |
| Seller 10 | 78238 | TX | 0.16% | 0.19% | 15.96% | A | 116 | High |

SYSTEM FOR OPTIMIZING LEAD CLOSE RATES

BACKGROUND

Sales leads may be used by retailers, dealers, and other sellers of goods and services, collectively referred to as "sellers", to identify potential buyers of goods and services, and to facilitate purchases. A sales lead or "lead" contains information related to the identity of a person or entity potentially interested in purchasing a good or service. Leads may come from a variety of different sources, including, for example, mailings, emails, phone calls, trade shows, database marketing, advertising, websites, search engines, etc. Quality leads, or leads deemed to match a certain criteria indicating that the person or entity is more likely to purchase a good or service may warrant a higher asking price than non-quality leads. In theory, a quality lead should result in higher seller close rates and, therefore, higher revenue. However, if a seller is a poor quality seller than the quality of the lead may not impact the close rate. In addition, companies that spend large sums of money on quality leads may not realize their investment if the sellers of their goods or services are low quality, or low quality for a particular type of lead. Accordingly, it would be desirable to have a system to determine the quality of a seller in terms of handling leads to better understand and optimize close rates, and, in turn, optimize revenue. It would also be desirable to have a system to automatically determine handling instructions in real-time for a specific lead targeted to a seller of known quality.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

By way of introduction, a close rate refers to the number of leads that generate into a sale over the total number of leads received. Close rates depend on a number of variables. For example, the quality of leads sent to the sellers may affect the close rate. Lead quality represents the propensity of a person or entity to purchase a good or service. The lead quality may be determined algorithmically by a number of attributes associated with the lead, including, for example, the interests of the person or entity, income level, location, etc. If a person or entity is not particularly interested in purchasing a good or service, then it is unlikely that the lead will result in a sale. Seller quality may also affect the close rate. Seller quality represents the propensity or ability that a seller will close a particular lead. Seller quality may directly reflect the seller's operation, sales staff and/or handling of leads. The seller quality may be the result of a number of attributes associated with the seller, including, for example, competency or friendliness of the sales force, timeliness of seller follow-up with leads, location of the seller, etc. If a seller is not successful in closing leads, then the quality of leads it receives may be irrelevant, or have less of an impact on the overall close rate. Other variables that may affect close rates include availability of the goods or services of interest; sales, promotions or purchasing incentives available at the time of the lead; time of year if it's a seasonal good or service; leads' financial ability to purchase the good or service, etc.

The difficulties in maximizing close rates stem, at least in part, from the fact that the quality of the seller may be unknown. By automatically associating sellers with a scoring model, the close rates of these sellers may be better understood and predicted. The scoring models may also be used to identify correlations between sellers' scores and leads. For example, if a seller yields a low score with a particular type of lead, it may modify its operations to increase its close rate for that lead type. In addition, leads may be refined and/or handled differently based on the quality of seller that the lead is going to. For example, if a quality lead is going to a quality seller, then the status quo may be preserved as the seller has a high propensity of closing the lead "as is." However, if a quality lead is going to a low quality seller, then value may be added to the lead to increase the probability that the seller will close. For example, an external follow-up service may contact the lead to help guide the lead through close. In addition, incentives may be added to the purchase of the goods or services to encourage the lead to complete the sale and/or aid the seller in closing the sale. A company may also choose which seller to send a lead if the lead qualifies for more than one seller, based on the seller's score for that type of lead.

The disclosed embodiments provide a system 100 for optimizing lead close rates. The system 100 may create and output a seller scoring model. The scoring model may be used to measure the quality of sellers and predict the sellers' close rates for future leads. The system 100 may utilize lead data, which comprises a number of leads, accumulated for a period of time, e.g. a month, six months, a year, or other time period, to create the scoring model. The lead data may be provided to the system 100 by a manufacturer, OEM, purchasing company or other companies or businesses that manufacturer, sell and/or advertise goods or services, or by a third party working on behalf of these companies. The lead data comprises various information pertaining to the leads, including, for example, the source of the leads, the sellers the leads were set to, and if the leads resulted in a sale. The system 100 may organize the lead data into subsets based on a common attribute, such as source or other quantitative attribute associated with the data. The system 100 may automatically compute a base close rate for the subsets that may be used to gauge the performance of each individual seller. The system 100 may normalize the sellers based on volume of leads received in order to avoid or limit the effects of overcompensating that may occur for sellers that receive a relatively low number of leads in a given time period. The system 100 may index the sellers into scoring tiers as a function of the base close rate. The system 100 may output the indexed sellers in the form of a scoring model.

The scoring model may be used by the system 100 or other systems in a variety of ways, as contemplated herein. For example, the system 100 may receive leads in real time directly from the lead source or automatically after the leads are generated. The leads may have associated with them quantitative characteristics or attributes that may be used to identify or determine a lead score or lead quality. The system 100 may analyze the leads against the seller scoring model to determine the quality of the sellers that will be receiving the leads. Based on the relationship between the lead scores and the seller scores, the system 100 may automatically determine a lead handling procedure to increase the likelihood that the leads will result in sales. The system 100 may output instructions for handling the leads. The system 100 may provide the instructions to the company or business to which the lead is directed or associated. The company or business, or other third party, may carry out the instructions to optimize its sellers' close rates and increase its revenue. The system 100 may also carry out the instructions, automatically or manually with user input.

Figure 1:
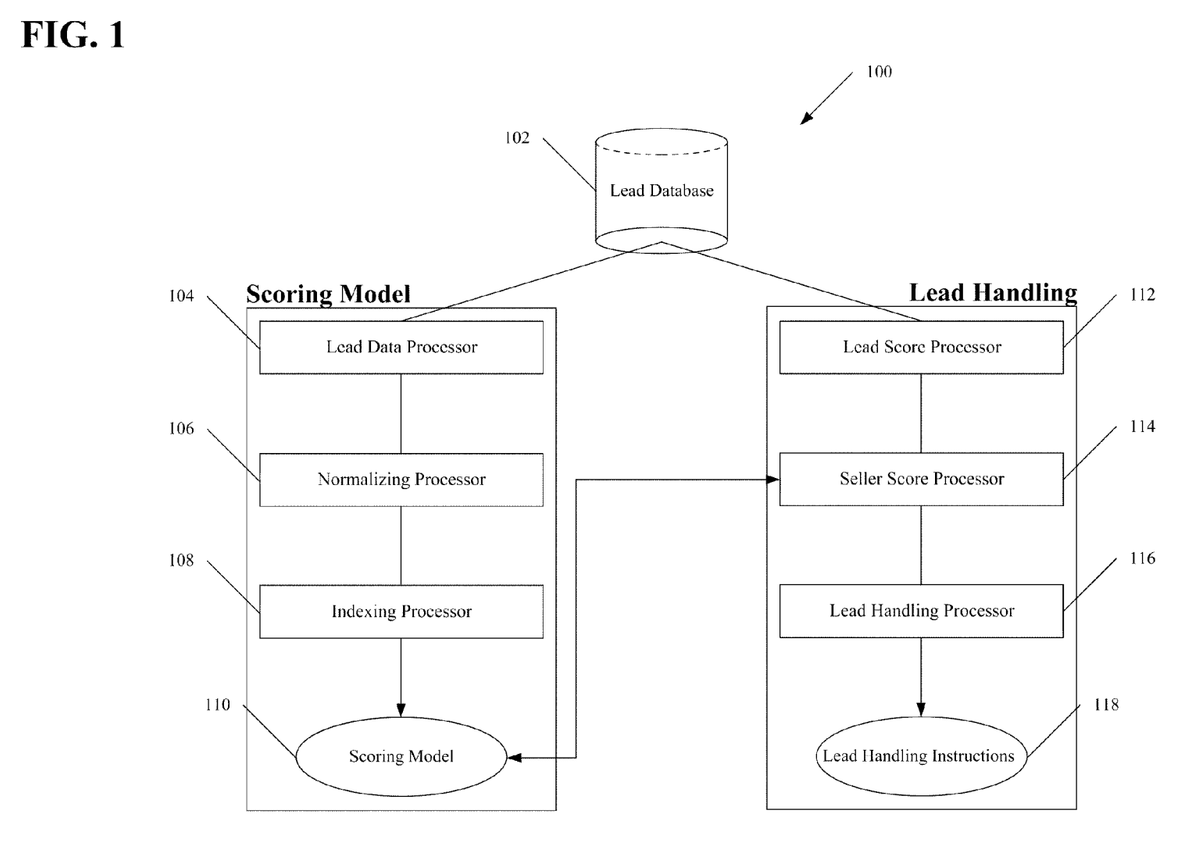
FIG. 1 is a block diagram of an exemplary system for optimizing lead close rates.

An example of a system 100 for optimizing lead close rates is shown in FIG. 1. As shown, the system 100 includes a lead database 102, a lead data processor 104 coupled with the lead database 102, a normalizing processor 106 coupled with the lead data processor 104, and an indexing processor 108 coupled with the normalizing processor 106. The foregoing components may comprise the scoring model portion of the system 100. The system 100 may also include a lead score processor 112 coupled with the lead database 102, a seller score processor 114 coupled with the lead score processor 112, and a lead handling processor 116 coupled with the seller score processor 114. These latter components may comprise the lead handling portion of the system 100. Herein, the phrase "coupled with" is defined to mean directly connected to or indirectly connected through one or more intermediate components. Such intermediate components may include both hardware and software based components. Each of the processors may be implemented in software, hardware or a combination thereof and one or more of the processors may be integrated together or further subdivided into additional discrete components. The system 100 may be implemented in one or more computer programs executing on one or more programmable systems comprising at least one processor and at least one data storage system. Each such program may be implemented in any desired computer language to communicate with a computer system.

The lead database 102 includes one or more databases and/or servers that contain lead data. The lead data may be populated manually and/or automatically. The lead data comprises leads and information and attributes associated with the leads. The leads contain information and attributes that may identify the person or entity interested in purchasing a good or service, such as name, address, contact information and other information, e.g. interests, income level, age, marriage status, etc. The leads may also contain information related to the seller to which the lead is directed, such as name, identification code, location, number of employees, and other information such as goods or services offered. Leads generated in a certain geographic area may be sent to a seller servicing that particular area. If more than one seller services that particular area, a seller may be selected, e.g. based on the seller score, described herein.

The leads may also contain information related to the goods or services of interest, such as good or service identification code and other information related to the good or service. The leads may also contain information on the source of the lead. The leads may come from a variety of sources, e.g. websites, search engines, or third party websites. The leads may also come from mailings, emails, phone calls, trade shows, advertising, etc. Leads originating from the same source may be referred to as the same type of lead, whereas leads originating from different sources may be referred to as different types of leads. An identification code identifying the source or type of leads may be associated with each lead. The leads may be organized in any manner in the lead database 102. For example, the leads may be arranged according to receipt time, seller destination, lead source, or other attribute associated with the leads.

The lead database 102 may receive and contain two types of lead data, "inactive" leads and "active" leads. Inactive leads refer to leads that have completed their lifecycle, i.e. the leads have been provided to sellers and the sellers either closed the lead, or they did not. Transactional information may be associated with inactive leads, which may include whether or not a sale occurred, identification of the sales person handling the leads, and the operational procedures of the seller, such as the number of contacts made to the leads, timeframe of the contacts, comments by the seller or leads, etc. If a sale was made, the inactive leads may also be associated with details relating to the sale, including, for example, sales price, date and time of sale, identification code to identify the particular goods or services purchased and any ancillary goods or services purchased therewith, sales person that made the sale, etc.

The average lifecycle of a lead may vary depending on the industry or field of the goods or services. For example, if the lead pertains to the automotive industry, the lifecycle may average ninety days from the time the lead is generated to the time the lead is either closed or not closed. If the lead pertains to real estate, the lifecycle may be much longer, e.g. six months or a year. The sellers report the transactional information related to the leads to the company manufacturing, selling and/or advertising the goods or services, or to a third party. The company, or third party, may accumulate and associate the transactional information with each lead and provide the lead to the system 100. As described below, the system 100 may use inactive lead data over a given period of time to create a seller scoring model that may be used to predict the quality of sellers, and optimize close rates for future leads.

Active leads, in contrast to inactive leads, have not completed their full lifecycle. Instead, these leads have not been provided to sellers and, therefore, are not associated with transactional information. Active leads may be received and contained by the lead database 102 in real time, or automatically sent to the lead database 102 immediately after they are created. The active leads may also be sent in batches in user-definable time periods. To facilitate the transfer of lead data, the lead database 102 may be connected to a network that enables it to communicate with and retrieve data from other computing devices. The network may include any communication method by which information may travel between computing devices. In one example, the lead data may be transferred as a dynamic file, such as extensible markup language ("XML"), although other types of files or formats may be utilized. As described below, the system 100 may analyze the active leads in conjunction with the seller scoring model to automatically devise or select a lead-specific set of handling instructions that may be used to optimize the close rate of the active leads.

Figure 2:
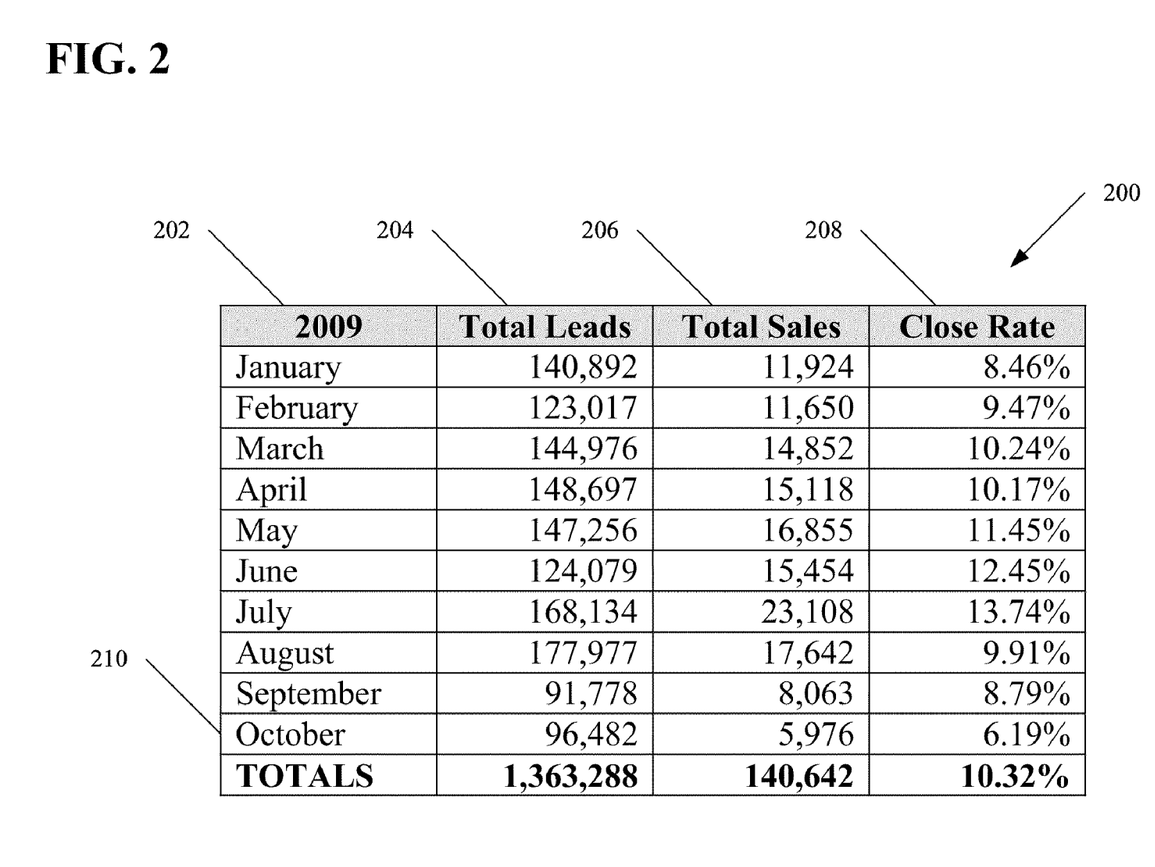
FIG. 2 is a table showing exemplary lead data for creating a seller scoring model.

As mentioned, the system may use inactive lead data accumulated over a given period of time to create a scoring model. The period of time may be dependent on the volume of leads. For example, the higher volume of leads used to create the scoring model, the higher confidence level in the scoring model. FIG. 2 shows an exemplary sample size 200 of inactive lead data that may be used to create a scoring model. In this example, the inactive lead data shown is representative of an automotive manufacturer's leads over a ten month period. For explanation purposes, the system 100 is described in terms of the automotive industry; however, it will be appreciated that the system 100 may be utilized in any industry or field in connection with the sale of any products or services. In FIG. 2, the leads are separated into months 202 in which the leads were served to sellers. The table includes the total leads served per month 204, the total sales generated from the leads 206 and the close rate 208. As shown, the close rate in October 210 falls short of the average close rate for the remaining nine months. There may be several reasons for this, for example, the sales force of the automotive sellers may not have recorded all of the transaction information associated with the October leads at the time the sample was cutoff, or there is time remaining in the October leads' lifecycles such that they have not been given sufficient time to close. Accordingly, in this particular example, the lead data in October 210 was discarded.

The lead data processor 104 is coupled with the lead database 102 and organizes the lead data stored in the lead database 102 to be used by the system 100 in creating the scoring model. The lead data processor 104 may classify the lead data into subsets of leads based on a common attribute, which may be used to measure the performance of sellers. For example, the lead data processor 104 may analyze the lead data and classify the leads into subsets according to their source as identified by a source identification code associated with the leads. It may be beneficial to determine how sellers perform against other sellers in handling leads from the same source. It may also be beneficial to determine how sellers handle leads from different sources. In addition, in terms of handling future leads from a known source, it would be beneficial to know how a particular seller has handled leads from that source in the past. By measuring sellers' performance against specific sources of leads, the system 100 may better predict how a seller will handle that particular type of lead in the future.

Figure 3:
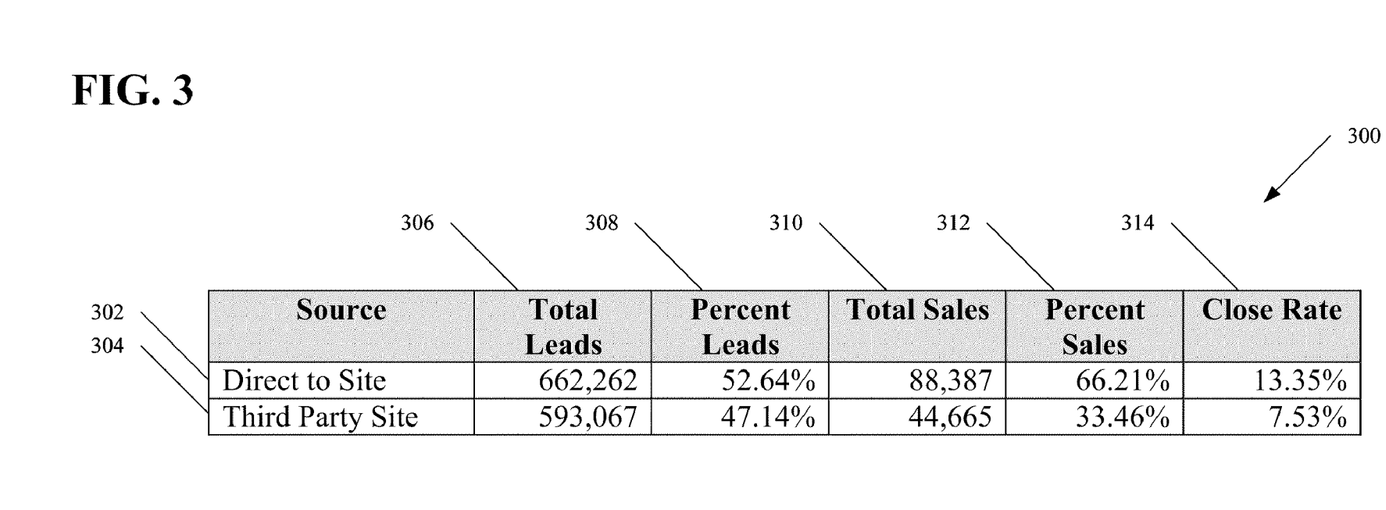
FIG. 3 is a table showing exemplary lead data categorized into two subsets as a function of lead source.

The lead data processor 104 may extract the source identification code and classify the leads into subsets based on the lead source. FIG. 3 shows exemplary lead data parsed into two subsets. In FIG. 3, the leads are classified into leads originating from "direct to site" source 302 and "third party site" source 304.

The lead data processor 104 may also extract the seller identification code and determine the sellers that received leads within a particular subset. The lead data processor 104 may also determine the performance of these sellers within the subsets by analyzing the transactional information associated with the leads. For example, the lead data processor 104 may automatically compute the average close rate for each seller of leads that fall within the subsets. The computed seller close rate may be referred to as the seller close rate, or "SCR." The lead data processor 104 may also automatically compute a base close rate ("BCR") for all leads across all sellers in each subset, which may be used to measure the performance of the sellers. For example, the lead data processor 104 may compute the average close rate for all leads in a subset. In this example, the sellers are scored as a function of performance in relation to their peers handling similar leads. The BCR may also be user definable and adjustable to obtain a desired scoring model. For example, a company may set the BCR at a high level to identify its top sellers and filter out all sellers that do not meet the threshold. It will be appreciated that other BCRs may be defined and/or computed by the lead data processor 104.

The table shown in the example at FIG. 3 shows the total leads 306 comprising each subset, the percentage of leads 308 against the sample size, the total sales 310 generated from the leads, the percentage of sales 312 against the sample size, and the BCR 314, which, in this example, equals the average close rate of all leads in the subset. As shown, the direct to site leads have nearly twice the average close rate as the third party leads. It will be appreciated that leads generated directly on a manufacturer's website generally have a higher close rate than leads generated on third party websites, which is represented in FIG. 3.

The lead data processor 104 may determine scoring tiers based on the BCR. The scoring tiers may be used to rank the sellers. The lead data processor 104 may determine any number of scoring tiers, which may be divided at any level of granularity, where each scoring tier represents or defines a quality level of the sellers. The granularity of the scoring tiers may be selected and/or defined to achieve a desired seller scoring model. For example, the lead data processor 104 may compute two scoring tiers defined as tier one and tier two, respectively, as follows: SCR≧BCR and SCR<BCR. In this example, if a seller's SCR falls into tier one, the seller may be deemed to have a high likelihood of closing a lead for the relevant source. Alternatively, if seller's SCR falls into tier two, the seller may be deemed to have a low likelihood of closing a lead.

In another example, the lead data processor 104 may compute four scoring tiers defined as tiers one thru four, respectively, as follows: SCR≧(BCR+x); (BCR+x)>SCR≧BCR; BCR>SCR≧(BCR−x); and (BCR−x)>SCR, where 'x' is user definable selected to achieve a desired scoring model. The variable 'x' may also be algorithmically computed by the lead data processor 104 based on patterns or statistical analysis performed on the lead data. In this example, if a seller's SCR falls into tier one, the seller may be deemed to have a high likelihood of closing a lead from the relevant source; in tier two, the seller may be deemed to have an above average likelihood of closing a lead; in tier three, the seller may be deemed to have a below average likelihood of closing a lead; and in tier four, the seller may be deemed to have a low likelihood of closing a lead. In another example, and as applied to the data in FIG. 3, described below, the lead data processor 104 may compute four tiers defined for the direct to site source as: SCR≧13.35; 13.35>SCR≧12; 12>SCR≧11; and 11>SCR; and the third party site as: SCR≧7.53; 7.53>SCR≧6; 6>SCR≧5; and 5>SCR. These tier limits are calculated based on a ten percent variance scale based on the BCR and rounded to the nearest percentage. However, as discussed herein, other tier limits may be used by the system 100.

The normalizing processor 106 is coupled with the lead data processor 104 and normalizes the sellers based on volume of leads received in order to avoid or limit the effects of overcompensating that may occur for sellers that receive a relatively low number of leads in a given time period. Sellers in different geographic locations, e.g. states, zip codes, etc., or offering different products or services may have large variability in terms of lead volume. Generally, the confidence level in the scoring model as a predictor of sellers' future success rate increases as volume increases. For example, if a seller receives a limited volume of leads, then a successful close may drastically increase the seller's score within the scoring model. However, this increased score may not necessarily reflect the quality of the seller, as over time, the seller may be deemed a low quality seller. To differentiate between these small sellers and large sellers, the normalizing processor 106 may rank the sellers based on volume of leads. The normalizing processor 106 may also track lead volume and withhold a seller from the scoring model until the seller reaches a definable threshold volume of leads.

The normalizing processor 106 may extract the seller identification code and determine the average volume of leads served to each seller in a given period of time, e.g. month, year or other period of time. The normalizing processor 106 may rank the sellers in categories representative of the volume of leads received within each subset. The categories may be user definable and based on the volume of lead data comprising the sample size, or may be algorithmically determined as a function of the lead data. For example, the normalizing processor 106 may rank the sellers into four categories based on the average volume of leads per month ("AVM"), defined as: $SCR \geq 50$; $50 > AVM \geq 30$; $30 > AVM \geq 20$; and $(BCR-x) > SCR$. In this example, if a seller's AVM is greater than or equal to 50 (first category), the seller may be deemed to have high lead volume. If the seller's AVM falls in the second category, defined above, the seller may be deemed to have an above average lead volume; in the third category, the seller may be deemed to have a below average lead volume; and in the fourth category, the seller may be deemed to have a low lead volume. The normalizing processor 106 may utilize any number of categories, which may be divided at any level of granularity, where each category represents or defines a volume description of the seller.

The indexing processor 108 is coupled with the normalizing processor 106 and indexes the sellers according to the scoring tiers determined by the lead data processor 104. The indexing processor 108 may parse through each seller identified in the inactive leads used to create the scoring model and automatically determine, based on the SCR where the seller fits in terms of the scoring tiers. The indexing processor 108 may output a scoring model representative of the sellers comprising the sample lead data set. The indexing processor 108 may tag identification codes representative of the indexed scoring tiers with each seller, and store this information with the seller in the lead database 102. The indexing processor 108 may tag each seller with an identification code to designate that the seller has been scored, and associate the identification code with the seller in the lead database 102. The indexing processor 108 may also compute statistical information relating to the sellers and output this information as part of the scoring model.

Figure 4:
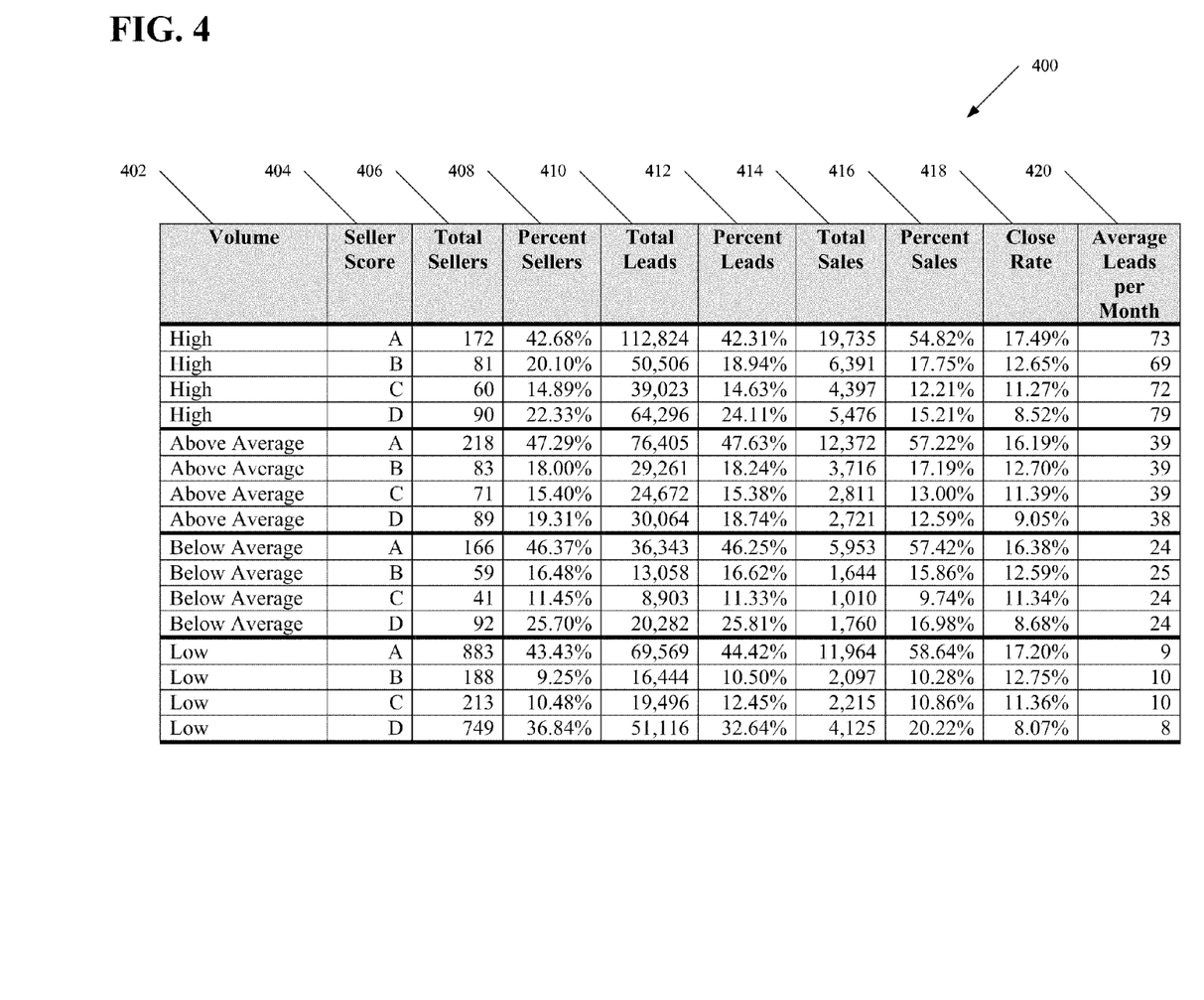
FIG. 4 is a table showing the results of an exemplary scoring model for a given subset.

FIG. 4 shows an exemplary scoring model 400 that may be output by the system 100, according to the exemplary lead data found in FIGS. 2 and 3. In this example, all sellers within the direct to site subset are scored and summarized in the scoring model 400. As shown, the sellers are categorized by volume category 402, and within the volume categories the sellers are indexed according to four scoring tiers, defined above. For example, in the high volume category and in the first tier, or score "A", there are 172 sellers, which comprises 42.68% of the total dealers falling within the high volume category. It will be appreciated that the scoring model can be modified to achieve desired results, such as through trial and error. In this example, if a company wanted to further distinguish between its top sellers, it could raise the threshold of the first scoring tier, or add additional scoring tiers.

The scoring model 400 may also contain statistical information computed from the lead data. In FIG. 4, the scoring model 400 shows the volume categories 402, seller score 404, total sellers 406 within each scoring tier, percentage of sellers 408 against the total number of sellers within a volume category, total leads 410 served on the sellers within each scoring tier, percentage of leads 412 against the total number of sellers, total sales 414 resulting from the leads, percentage of sales 416 against the total number of sales within the volume category, average close rate 418 for the sellers within each scoring tier, and the average leads per month 420 received by the sellers within each scoring tier. The system 100 may output a scoring model for each subset created. The system 100 may also output a scoring model across multiple subsets. A company may therefore learn how sellers perform across several types of leads, and it can distinguish its top overall performers across a variety of lead types.

Figure 5:
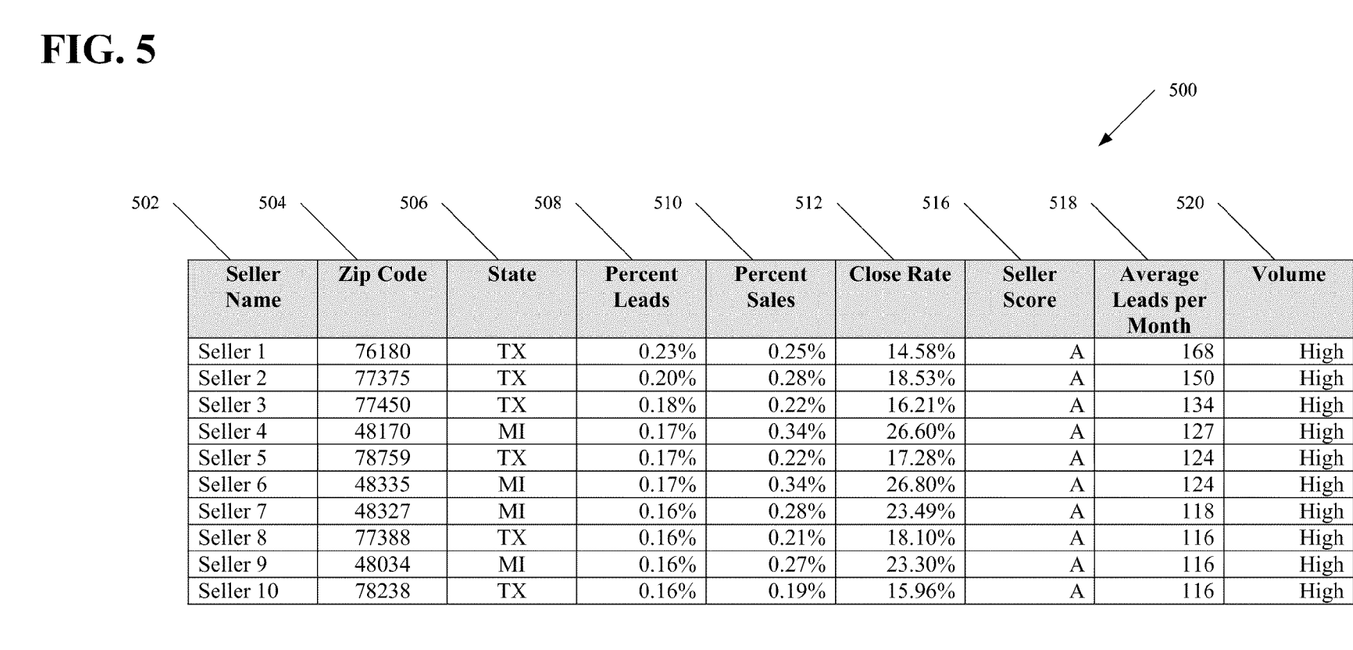
FIG. 5 is a table showing exemplary top ten sellers of the exemplary scoring model in FIG. 4.

FIG. 5 shows an exemplary scoring model 500 that may be output by the system 100, according to the exemplary lead data found in FIGS. 2 and 3. In this example, the sellers within the direct to site subset are ranked according to performance within the subset. Only the top ten sellers are shown, although the entire lot of sellers may be ranked in a similar manner. From this scoring model, the top sellers for a particular type of lead may be identified. Similarly, the top sellers for any number of lead types may also be identified. The scoring model 500 may represent information related to the specific sellers. For example, FIG. 5 shows the seller name 502, zip code 504 of the seller, seller state 506, percentage of leads 508 provided to the sellers against the total leads in the subset, percentage of sales 510 generated from the leads, close rate percentage 512, seller score 516, average leads per month 518 provided to the seller, and volume category 520. It will be appreciated that the system 100 may output a number of scoring models based on the lead data, which may be used to rank sellers' performance. The system 100 may output the scoring models in tables, charts, lists or in other organization formats. The system 100 may also automatically update scoring models in given periods of time. For example, as the system 100 continues to receive inactive lead data, the system 100 may update the scoring models weekly, monthly, bi-annually, etc.

Figure 6:
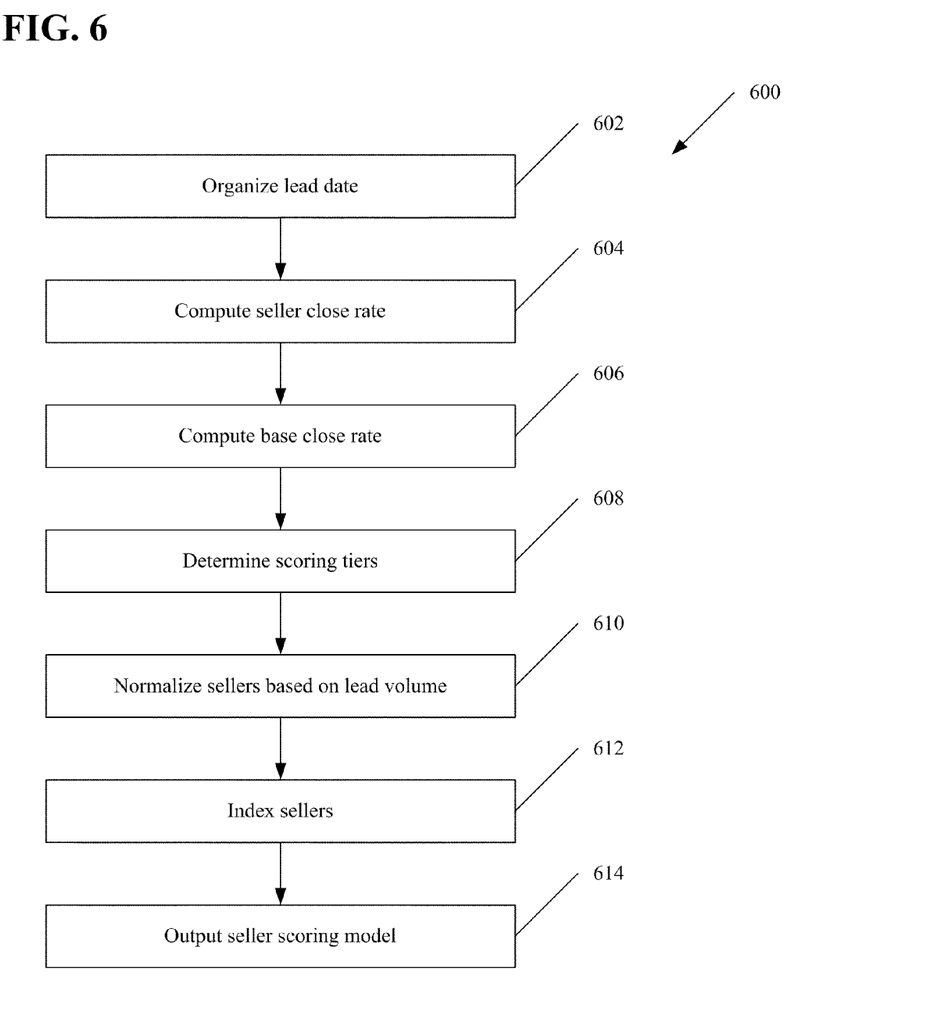
FIG. 6 is a flow chart of one example of creating a scoring model as a function of lead data.

A flow diagram illustrating an exemplary process 600 according to one embodiment is shown in FIG. 6. The process may be implemented for use with the system 100 or a different system. The process 600 begins with the organization of lead data, represented by block 602. The lead data may comprise inactive lead data mined over a period of time. The lead data may be organized into subsets of leads based on lead source. The process 600 proceeds to block 604 where a seller close rate may be computed for each seller provided leads within each subset. The seller close rate may comprise the average close rate for the seller for the particular type of lead. The process 600 proceeds to block 606 where a base close rate may be computed for each subset. The base close rate may comprise the average close rate for all leads within the subset, across all sellers within that subset. The base close rate may be used to measure the performance of the sellers.

The process 600 proceeds to block 608 where the scoring tiers are determined based on the base close rate. The process 600 proceeds to block 610 where sellers are normalized based on lead volume. The sellers may be categorized based on volume of leads received within a given period of time. The process 600 proceeds to block 612 where the sellers are indexed as a function of the scoring tiers within each volume category. The sellers may be indexed into the scoring tiers based on the computed seller close rates. Each seller may be tagged with identification information that designates where the seller falls in terms of the scoring tiers and volume categories. The process 600 proceeds to block 614 where a seller scoring model is output. The seller scoring model may comprise scoring information related to each seller identified in the lead data, and volume information related to the sellers that may be used to gauge the confidence level in the scoring model.

The scoring models may be used by the system 100 to measure the quality of sellers and predict sellers' close rates for future leads. The scoring models may be used in connection with the lead handling portion of the system 100. As mentioned, the lead handling portion comprises the lead score processor 112, seller score processor 114 and lead handling processor 116. The lead score processor 112 is coupled with the lead database 102 and may retrieve active leads contained in the lead database 102. The active leads may be sent to the lead database 102 in real time, or automatically after the active leads are generated. The active leads may be associated with attributes or characteristics that may be used to identify or determine a lead score associated with the lead. The lead score processor 112 may identify or determine lead scores based on the lead attributes and characteristics by means known in the art. Based on the leads scores, the lead score processor 112 may determine a quality of the lead.

The seller score processor 114 is coupled with the lead score processor 112 and may retrieve the seller identification code to determine the destination of the active lead. The seller score processor 114 may search the scoring model output by the system 100 to locate the seller score. The seller score processor 114 may associate the seller score with the active lead. If a seller score does not exist in the scoring model, e.g. if the active lead is targeted for a new seller or if the seller was not comprised of the sample data used to create the scoring model, the seller score processor 114 may flag the lead as not being associated with a seller score.

The lead handling processor 116 is coupled with the seller score processor 114 and may automatically determine a lead handling procedure to increase the likelihood that leads will result in sales. The handling procedures may be based on the lead score and seller score. The handling procedures may differ depending on the combination of lead score and seller score. For example, a high lead score matched with a high seller score may result in a high propensity that the seller will close the sale. In this example, the handling procedure may be to maintain status quo. In other combinations of lead scores and seller scores, it may be beneficial to add value to the lead in order to maximize its potential for resulting in a sale. The value may be in the form of incentives added to the purchase of goods or services to further encourage the lead to follow through with the sale. The value may also be a follow-up service that may contact the lead via phone, email or other communication to help guide the lead to close. Other forms of value may also be used, e.g. informing the seller of the lead quality and instructing the seller how to handle the lead, redirecting the lead to a higher quality seller if the lead qualifies for more than one seller, providing incentives to the seller for closing the lead, etc.

Figure 7:
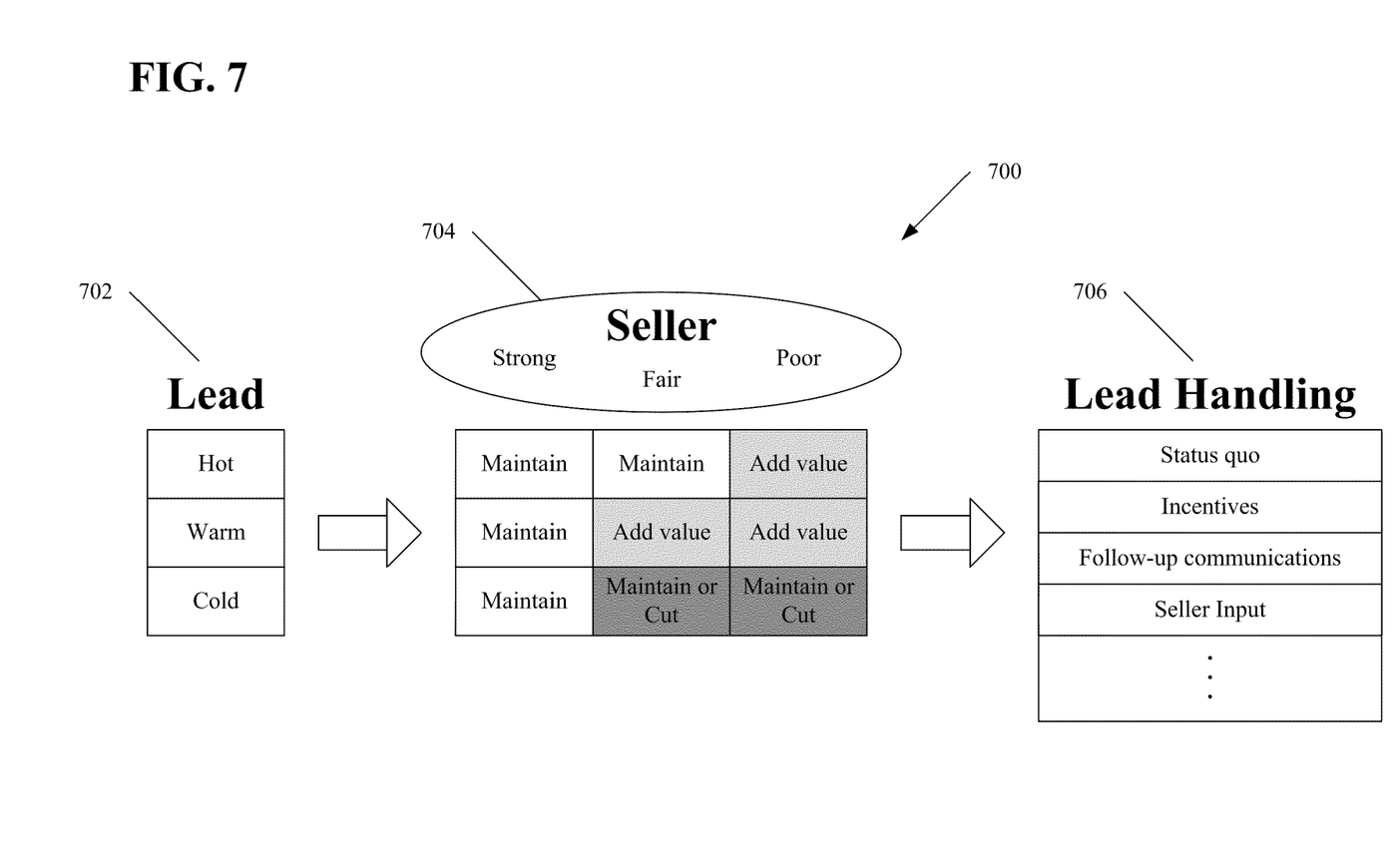
FIG. 7 if a block diagram of an exemplary procedure for selecting lead handling instructions.

FIG. 7 shows an exemplary block diagram for demonstrating examples of selecting handling instructions. A lead score 702, a seller score 704 and a lead handling instruction 706 is shown in FIG. 7. The lead score 702, in this example, is categorized as hot, warm or cold, although other scores, grades, labels or categorizations may be used. Likewise, the seller score 704, in this example, is categorized as strong, fair or poor, although other scores, grades, labels or categorizations may be used. The lead handling instructions 704 include maintaining the status quo, adding value in the form of incentives, adding value in the form of follow-up communications, such as phone calls, emails, etc., and providing input to the seller regarding the lead, although other handling instructions may be included and utilized. The lead handling instructions 704 may be selected based on the combination of lead scores 702 and seller scores 704. For example, if the lead score 702 is hot, and the dealer score 704 is strong, then the lead handling processor 116 may select maintaining the status quo as the lead instruction, as the seller may have a high propensity of closing the lead without the need for adding value to the lead. In FIG. 7, the lead handling processor 116 may also maintain the status quo each time the seller score 704 is strong, regardless of the lead score 702. The lead handling processor 116 may also maintain the status quo if the seller score 706 is fair, but the lead score 702 is hot.

Alternatively, if the lead score 702 is hot and the seller score 704 is poor, value may be added to the lead. Similarly, if the lead score 702 is warm and the seller score 704 is either fair or poor, value may also be added to the lead. In these combinations, the added value or cost to a company may yield higher returns in increased sales, which may justify the added value to the lead. The value may be automatically selected based on available incentives or promotions available at the time, or the availability of a third-party follow-up communication service. The value may also be selected according to a lead handling model that may be trained based on past data and/or trial and error. The value may also be manually selected. The value may comprise one or any combinations of available handling instructions. As shown in FIG. 7, if the lead score 702 is cold and the seller score 704 is fair or poor, then added value may have no impact on the close rate and therefore the added value or cost may not be justified. Here, the lead handing processor 116 may maintain the status quo so as to not spend resources. The lead handling processor 116 may also cut or withhold the lead from being served so as to not expend resources of the seller in view of the low likelihood of the lead resulting in a sale.

Figure 8:
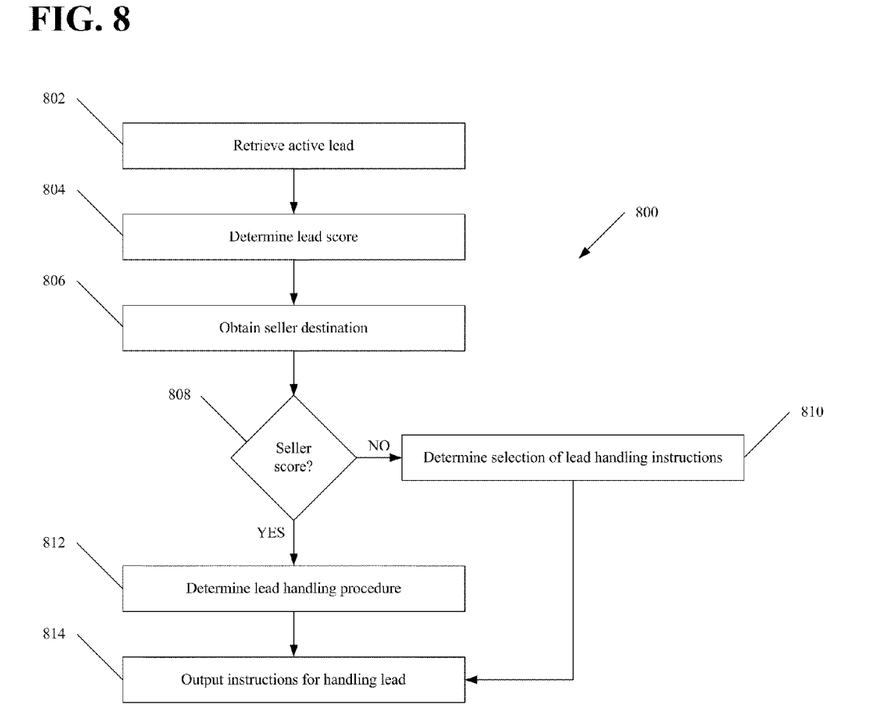
FIG. 8 is a flow chart of one example of creating lead handling instructions based on an active lead and a seller scoring model.

A flow diagram illustrating an exemplary process 800 for optimizing lead close rates is shown in FIG. 8. The process 800 may be implemented for use with the system 100 or a different system. The process 800 begins with the retrieving of an active lead contained on the lead database 102, represented by block 802. The active lead may be transferred to the lead database in real time, or automatically after the lead is generated from a source. The process 800 proceeds to block 804 where a lead score is identified or determined from lead data associated with the active lead. The process 800 proceeds to block 806 where the seller's destination is obtained from the lead. The seller's destination may be determined from an identification code or other information associated with the lead. The process 800 proceeds to decision block 808 where it is determined if the identified seller has a seller score as contained in a seller scoring model.

If the seller does not have a score associated with it, then the process 800 branches to block 810 where the selection of a lead handling instruction is determined. The lead handling instruction may be a default instruction for sellers. If the seller's score is determined, then the process 800 proceeds to block 812 where the lead handling procedure is determined based on the combination of the lead score and seller score. The process 800 proceeds to block 814 where the instructions for handling the lead are output. The instructions may be output automatically, and may be used to increase the likelihood that the lead will result in a sale.

It will be appreciated that the system 100, as described herein, may be used to analyze and score data in a variety of fields outside sales leads. The system 100 may create scoring models on any type of data where two or more sets of heterogeneous data may have correlated performance impact on their interaction and therefore may be analyzed and scored. For example, the system 100 may be used to create scoring models based on the success of college students. In this example, the system 100 may receive data representative of students, including age, test scores, major, interests, etc., over a period of time. The system 100 may organize the student data into subsets based on one or more common attributes. For example, the system 100 may be used to determine the success rate of students based on test scores, and all students having a particular test score, or that fall within a specified range of test scores, may be categorized in the same subset. The system 100 may create a base success rate for the subsets, e.g. grade point average, graduation rate, job placement, intellectual property created, etc., which may be used to create scoring tiers and gauge the performance of the students. The system may normalize the students based on volume, and index the students into scoring tiers as a function of the base success rate to output a student scoring model. The system 100 may utilize the student scoring model to determine handling instructions for future students in order to increase the future students' success rate. The system 100 may also be utilized to create scoring models for employees, businesses, advertisements, and any other performance metrics where data representative of the subject matter is logged for a period of time and may be scored by the system 100 based on performance, as described herein.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method of scoring the performance of a handler of sales leads comprising: organizing, in a database on a data storage system, lead data representative of sales leads into one or more subsets based on at least one attribute common to the subsets; computing, with a processor implemented through instructions stored and executed on a programmable computer system, a base close rate for each of the one or more subsets, wherein the base close rate comprises a close rate of handlers of sales leads within a particular subset; determining, with the processor, scoring tiers as a function of the base close rate; computing, with the processor, a seller close rate for at least one handler of sales leads within a subset; and indexing, with the processor, the handler within the scoring tiers as a function of the seller close rate to classify the performance of the handler.

2. The method of claim 1 further comprising:
normalizing, with the processor, the lead data as a function of volume of leads received by the handler within a specified time period.

3. The method of claim 2 wherein the normalizing comprises:
classifying, with the processor, the lead data within a plurality of categories based on volume of leads received by the handler within a specified time period.

4. The method of claim 1 wherein the at least one attribute comprises a source of the sales leads.

5. The method of claim 1 wherein the scoring tiers are used to predict the close rates for handlers of future sales leads.

6. The method of claim 1 further comprising:
automatically outputting, with the processor, sales leads handling instructions as a function of the scoring tiers and a sales lead score determined from the lead data.

7. A method of outputting sales leads handling instructions comprising:
creating, with a processor through instructions stored and executed on a programmable computer system, a seller scoring model to measure the performance of sellers with specific types of sales leads;
receiving, with the processor, an active lead targeted to a particular seller;
comparing, with the processor, an identified lead score of the active lead with an identified seller score from the seller scoring model corresponding to the particular seller; and
determining, with the processor, one or more lead handling instructions as a function of the comparing.

8. The method of claim 7 wherein the creating further comprises:
categorizing, with the processor, inactive lead data into subsets based on lead source;
computing, with the processor, a base close rate for each subset;
categorizing, with the processor, the inactive lead data into a plurality of scoring tiers as a function of the base close rate to create the seller scoring model.

9. The method of claim 8 wherein the creating further comprises:
normalizing, with the processor, the inactive lead data based on a volume.

10. The method of claim 7 wherein the one or more lead handling instructions comprises at least one of a maintain status quo and adding value to the active lead.

11. A system for creating a scoring model to measure the performance of sellers in terms of handling sales leads comprising: a lead database configured to store lead data representative of sales leads provided to sellers; a lead data processor coupled with the lead database and configured to categorize the lead data into a plurality of subsets based on a source of the lead data, compute a base close rate for at least one of the plurality of subsets, and define a plurality of scoring tiers as a function of the base close rate; a normalizing processor coupled with the lead data processor and configured to normalize the lead data based on volume; and an indexing processor coupled with the normalizing processor and configured to index the sellers into scoring tiers representative of the performance of the sellers, wherein the indexed sellers comprise a scoring model.

12. The system of claim 11 wherein the lead database comprises inactive lead data collected over a pre-determined period of time.

13. The system of claim 11 wherein the lead data is categorized as a function of a source identification code.

14. The system of claim 11 wherein the normalizing processor is configured to:
create volume categories based on volume of sales leads provided to sellers in a selected time period; and
classify the lead data in the volume categories.

15. A system for creating a seller scoring model comprising:
categorizing means for categorizing lead data received over a period of time as a function of a common attribute associated with the lead data;
computing means, coupled with the categorizing means, for computing a base close rate as a function of the lead data;
normalizing means, coupled with the computing means, for normalizing the lead data based on volume; and
indexing means, coupled with the normalizing means, for indexing the sellers into scoring tiers determined as a function of the base close rate.

16. The system of claim 15 wherein the lead data comprises a plurality of sales leads associated with transactional information.

17. The system of claim 15 wherein the common attribute comprises a source of the lead data.

18. The system of claim 15 wherein the base close rate comprises an average close rate computable from the lead data.

19. The system of claim 15 further comprising:
lead handling means, coupled with the indexing means, and configured to determine one or more lead handling instructions for an active lead as a function of the indexing means and an identified active lead score.

* * * * *